US010264450B2

(12) United States Patent
Vicente Ruggiero et al.

(10) Patent No.: US 10,264,450 B2
(45) Date of Patent: Apr. 16, 2019

(54) AUTHENTICATION METHOD USING EPHEMERAL AND ANONYMOUS CREDENTIALS

(71) Applicant: SCOPUS SOLUCOES EM TI LTDA, Sao Paulo (BR)

(72) Inventors: Wilson Vicente Ruggiero, Sao Paulo-Sp (BR); Armin Werner Mittelsdorf, Sao Paulo-Sp (BR); Adren Sassaki Hirosi, Sao Paulo-Sp (BR); Reginaldo Arakaki, Sao Paulo-Sp (BR); Fabian Martins Da Silva, Barueri-Sp (BR)

(73) Assignee: SCOPUS SOLUCOES EM TI LTDA, Sao Paulo (BR)

( * ) Notice: Subject to any disclaimer, the term of this patent is extended or adjusted under 35 U.S.C. 154(b) by 95 days.

(21) Appl. No.: 15/313,313

(22) PCT Filed: May 21, 2015

(86) PCT No.: PCT/BR2015/050060
§ 371 (c)(1),
(2) Date: Nov. 22, 2016

(87) PCT Pub. No.: WO2015/176149
PCT Pub. Date: Nov. 26, 2015

(65) Prior Publication Data
US 2017/0099603 A1 Apr. 6, 2017

(30) Foreign Application Priority Data
May 23, 2014 (BR) .......................... 1020140126031

(51) Int. Cl.
G06F 21/34 (2013.01)
H04W 12/06 (2009.01)
(Continued)

(52) U.S. Cl.
CPC ............ H04W 12/06 (2013.01); G06F 21/34 (2013.01); H04L 9/0863 (2013.01);
(Continued)

(58) Field of Classification Search
CPC ...................................................... H04L 9/3271
See application file for complete search history.

(56) References Cited

U.S. PATENT DOCUMENTS

2007/0088952 A1    4/2007  Hewitt et al.
2016/0269410 A1*  9/2016  Liu ....................... H04L 63/083

OTHER PUBLICATIONS

International Search Report dated Sep. 1, 2015, International Application No. PCT/BR2015/050060, filed May 21, 2015.

* cited by examiner

Primary Examiner — Josnel Jeudy
(74) Attorney, Agent, or Firm — Dinsmore & Shohl LLP

(57) ABSTRACT

A user accesses an intermediary device, in communication with a restricted entity, requires a One Time Credential OTC and activates a mobile device previously registered, by the user, in an authentication entity, in order to generate a OTC, based on the information related to the user, to the restricted entity, to the mobile device and to the authentication entity, the OTC credential being then typed in the intermediary device and transmitted therefrom to the restricted entity and, from the latter, to the authentication entity, in which the OTC credential is decrypted and compared with the information related to the user, to the restricted entity, to the authentication entity and to the mobile device registered in the authentication entity, in order to generate an authentication result which is transmitted to the restricted entity, which will decide to accept or to reject the access of the user.

6 Claims, 2 Drawing Sheets

(51) Int. Cl.
*H04L 9/32* (2006.01)
*H04L 29/06* (2006.01)
*H04L 9/08* (2006.01)

(52) U.S. Cl.
CPC .......... *H04L 9/0872* (2013.01); *H04L 9/3215* (2013.01); *H04L 9/3228* (2013.01); *H04L 63/0838* (2013.01)

AUTHENTICATION METHOD USING EPHEMERAL AND ANONYMOUS CREDENTIALS

FIELD OF THE INVENTION

The present invention refers to a method which allows a user to effect his authentication before an entity having access control requirements, without the user's identity being compulsorily revealed to said entity. For this purpose, the user utilizes a credential with short validity, which changes with time, similarly to the passwords generated by OTP (One Time Password) tokens. Said credential substitutes the login (name, nickname, account identification, income tax registration number (CPF) or e-mail address) and, if desired or convenient, even the password.

STATE OF THE ART

At present, electronic systems, such as sites, softwares, computers, automatic teller machines (ATMs) and the like, having restricted access to determined users, require, from these users, some information for identifying them, and also a type of password. The information which identifies the user (login) is represented by its name, nickname (username) account identification, income tax identification number (CPF) or e-mail address. In order to complete the authentication, a password and/or biometric information is given, which must correspond to the identification information previously given.

Although being commonplace, the above mentioned procedure is associated with a number of problems. The users must memorize an amount of sets, identifiers (logins) and passwords, proportional to the systems to be accessed.

When required to present his identification, the user reveals his identity, either to the system itself, or to an eventual hacker who may intercept his data. In case a hacker intercepts the data, it is easy to cancel a fixed password, by simply changing it. The OTPs (One Time Passwords) change constantly, limiting the attacks to the probability of the hacker to match the password which is valid in that instant. The login (username, CPF, bank account number, etc.), differently from the passwords, usually remains the same. Once with the login, the hacker may try future attacks, even if the user changes his password or uses OTPs (One Time Passwords), through methods including brute force, dictionary attacks, etc.

SUMMARY OF THE INVENTION

In view of the problems mentioned above, it is an object of the present invention to provide a method which allows a user to carry out his authentication before an entity having access control requirements (restricted entity), by using time-varying credentials. Said variable credential, as proposed herein, will be called OTC (One Time Credential) hereinafter.

The OTC has the purpose of protecting the privacy of the user, and has the form of a number or sentence, which are aleatory to an outer observer, however capable of being understood and validated by an authentication entity. The OTCs (One Time Credentials) are generated by mobile devices capable of executing an OTC program and which may be defined, for example, by tablets, cell phones or tokens (devices dedicated to this functionality).

The user activates the OTC program in its mobile device, for obtaining an OTC and then types this OTC on the screen of an intermediary device which runs a program that gives access to the restricted entity. The OTC, typed on the screen of the intermediary device and transmitted by the latter to the restricted entity, is retransmitted by the restricted entity to an authentication entity, whose purpose is to verify whether said OTC is valid. The authentication entity deciphers the OTC, by using cryptographic keys, time information and information of the restricted entity.

The result of the operation defined above will be the positive authentication, when it is possible to extract the user's identification from the given OTC, or a negative authentication in the opposite case. The result is transmitted to the restricted entity. Finally, once having the authentication result, the restricted entity decides how to continue the interaction with the user.

While presenting an apparent similarity with the OTPs, there are major differences between an OTP and an OTC.

The OTP, which is presently widely known and utilized by many banking institutions and companies, is used jointly with a login. The OTP alone is not enough to authenticate the user. The OTP authentication server needs the user's login, in order to allow retrieving the corresponding cryptographic keys and, with the latter, a new OTP to be generated and then compared with the OTP provided by the user.

The OTC, on the other hand, dispenses the login, since it is embedded therein, as well as the OTP, which also has time characteristics.

The present authentication method allows a user to execute his authentication before an authentication entity, in order to gain access to a restricted entity.

According to the invention, the method comprises the steps of: accessing, by the user, an intermediary device provided with a screen and enabled to run an access application which communicates with the restricted entity by means of a communication channel; requiring, on the screen of the intermediary device, a One Time Credential OTC necessary for the authentication of the user; activating, by the user, an OTC program previously downloaded in a mobile device previously registered by the user in the authentication entity, in order to generate a One Time Credential OTC, based on information related to the user, to the restricted entity, to the mobile device and to the authentication entity; typing, by the user, the One Time Credential OTC, generated by the mobile device, in the intermediary device running the access application; transmitting, through the communication channel and by means of the access application, the One Time Credential OTC, from the intermediary device to the restricted entity which runs a restricted application; transmitting the One Time Credential OTC from the restricted entity to the authentication entity, through a communication channel; decrypting, in the authentication entity, the information related to the user, to the restricted entity, to the mobile device and to the authentication entity, which form the One Time Credential OTC; comparing, in the authentication entity, the decrypted data of the One Time Credential OTC with the information related to the user, to the restricted entity, to the authentication entity, and to the mobile device registered by the user in the authentication entity, and generating an authentication result; transmitting the authentication result to the restricted entity; and deciding, by the restricted entity, to accept or to reject the user's access to the restricted entity, as a function of the authentication result.

With the method proposed herein, it is possible for a user to effect his authentication to access a restricted entity, by obtaining, in an easy and secure manner, a One Time Credential OTC, which is specific and exclusive for the access operation being carried out, without his personal identification being exposed in the content of the data transmitted between the intermediary device and the restricted entity, as well as between the latter and the authentication entity, particularly in the cases in which said authentication entity is an entity distinct from the restricted entity and located away from the latter.

BRIEF DESCRIPTION OF THE DRAWINGS

The invention will be described below, with reference being made to the appended drawings, given by way of example of one embodiment of the invention and in which.

DESCRIPTION OF THE INVENTION

Figure 1:
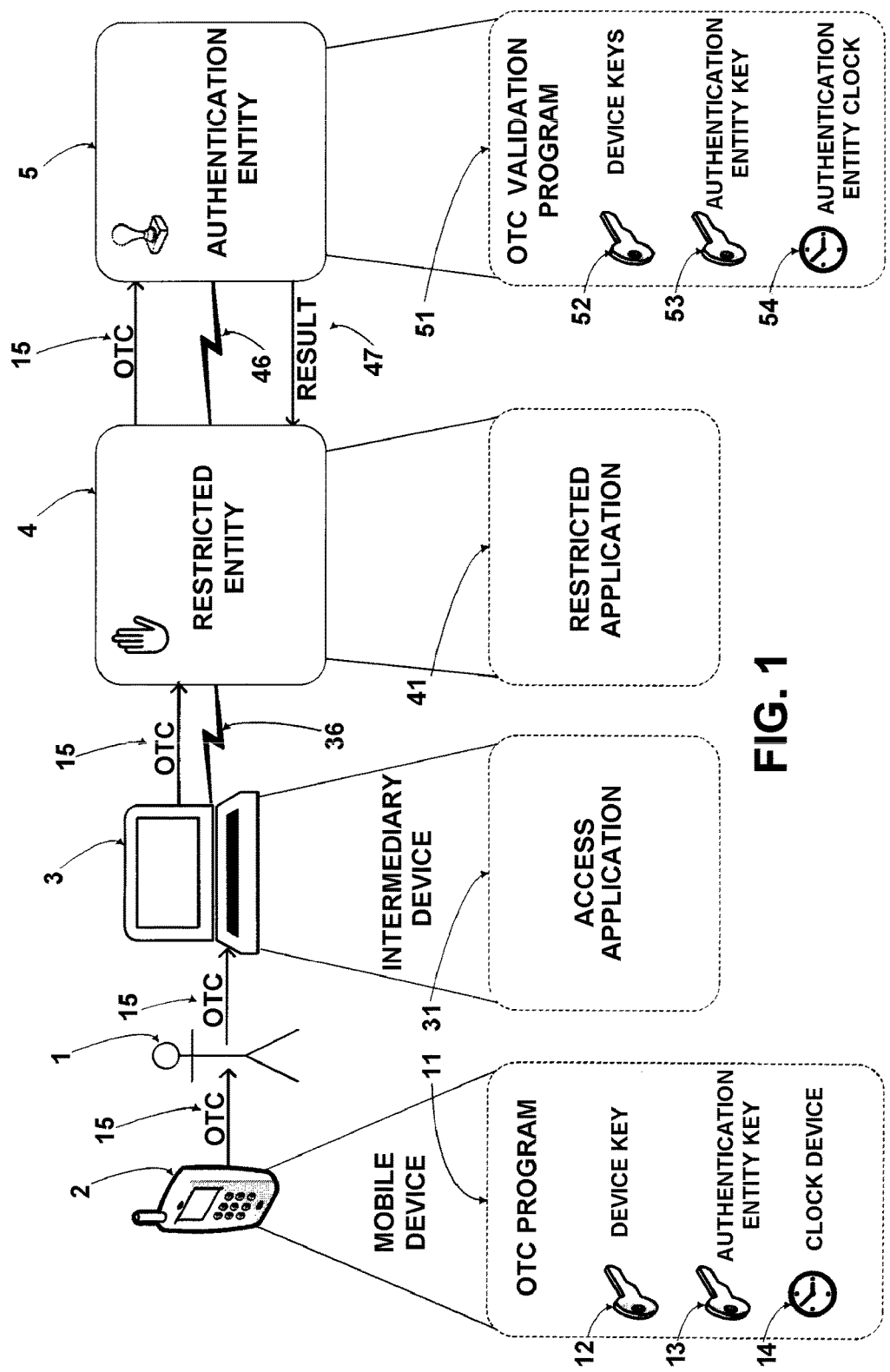
FIG. 1 represents a schematic block diagram of the constitutive elements of the invention, illustrating the interaction between said elements.

As it may be observed in FIG. 1, the present method is particularly adequate to the interaction of a user 1 using a mobile device 2 to access a restricted entity 4 through an intermediary device 3.

The mobile device 2 may be a programmable mobile device, such as, for example, a cell phone, a smart phone, a smart watch, a tablet or a media player, which is capable of executing an OTC program 11. The mobile device 2 may also be a dedicated mobile device specially designed for this purpose, such as a token.

The intermediary device 3 may be any device which may be used as an interface between the user 1 and the restricted entity 4 as, for example, a personal computer, a notebook, another mobile device, such as that indicated by the reference number 2, totems, kiosks, turnstiles, vending machines, POSs (terminals or points of sale) and ATMs (automatic telling machines).

The restricted entity 4 runs a restricted application 41, that is, an application having restricted access requirements and which may be any application currently protected by a login and a password to give access to sites, computers, networks, information storage, banks, withdrawals, cards, etc. The restricted application 41 may also give access to restricted systems, with the use of codes deprived of passwords, as is the case of software licenses, tickets, vending machines, withdrawals, gift coupons, etc.

The intermediary device 3 runs an access application 31, responsible for presenting the interface with the user, both upon presenting the login screen, and upon receiving a One Time Credential OTC 15 which is typed by the user in the mobile device 2. The access application 31 also effects communication with the restricted entity 4 through a communication channel 36, either wired or wireless, through which it transmits the One Time Credential OTC 15.

The restricted entity 4 utilizes the wired or wireless communication channel 46 for transmitting the One Time Credential OTC 15 which must be authenticated by an authentication entity 5. The authentication entity 5 runs a OTC validation program, for validating the One Time Credential OTC 15 received. The authentication result 47, whether positive or negative, is transmitted to the restricted entity 4, using the communication channel 46. When the authentication result 47 is positive, the authentication entity 5 decides to accept the access of the user 1 and may transmit, as the authentication result 47, the positive value with the identifier of the user in the restricted entity 4.

On an opposite way, when the authentication result 47 is negative, the authentication entity 5 decides to reject the access of the user 1, transmitting this negative result back to the intermediary device 3.

Thus, if the restricted entity 4 founds it necessary, it may require other authentication data, in order to enforce the authentication process of the user 1, such as passwords and biometry, composing a multi-factor authentication.

Initially, with possession of the One Time Credential OTC 15, the restricted entity 4 does not know who the user is, because the One Time Credential OTC 15 maintains the anonymity of the user 1. However, the identification of the user 1 may be important to select his password or biometric signature for comparison in authentication complementary steps.

The situation shown in FIG. 1 is generic and presents the restricted entity 4 and the authentication entity 5 as distinct elements. These two entities may exist separately or as a single entity.

A situation in which the entities are distinct may be represented by any buying site in the internet, in which the restricted entity 4 is the site itself and the authentication entity 5 is an outside company that provides authentication services to restricted entities 4. A grouping situation would be represented by a banking institution that desires to have total control over the authentication process.

Figure 2:
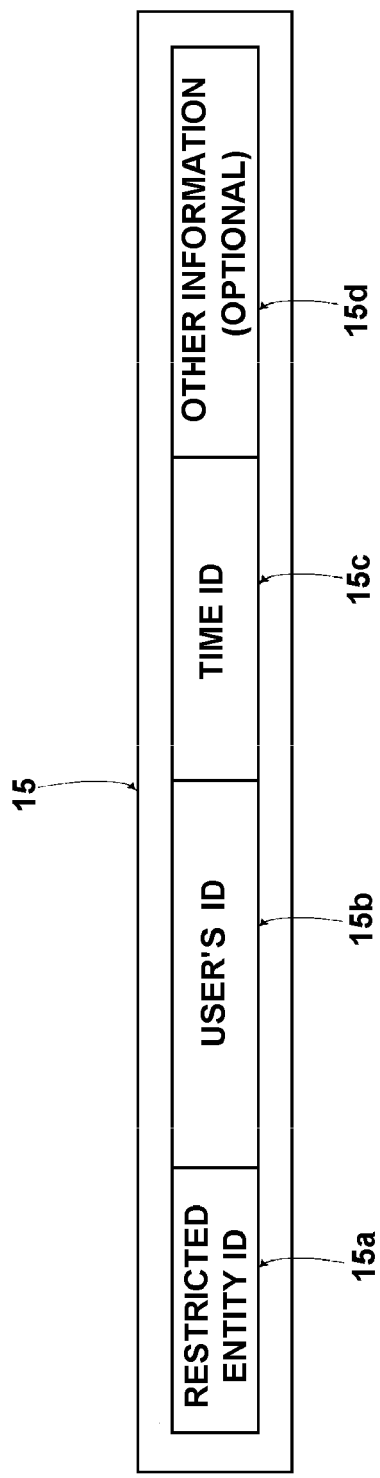
FIG. 2 represents a schematic block diagram of the information which forms the One Time Credential OTC.

FIG. 2 shows the information block used in the generation of a One Time Credential OTC 15 in the mobile device 2. In order to better understand the generation and validation process it is necessary to observe FIGS. 1 and 2.

In the generation of the One Time Credential OTC by the mobile device 2 there are used a restricted entity identifier 15a, a user identifier 15b, a time information identifier 15c and, optionally, other pieces of information 15d. Said pieces of information are cryptographed by using an authentication entity key 13, provided in the OTC program 11 that runs in the mobile device 2. The time identification information is generated, through a cryptographic algorithm, by using a device clock 14 and a device key 12, both of the mobile device 2 and belonging to the OTC program 11.

The validation performed in the authentication entity 5 follows the reverse process. The One Time Credential OTC 15 is decrypted by using the authentication entity key 53 provided in the authentication entity 5, resulting in the information block previously utilized for generating the One Time Credential OTC 15 under authentication process. The restricted entity identifier 15a, the user identifier 15b and other information 15d are used to obtain a device key 52 provided in the authentication entity 5 and which, jointly with an authentication entity clock 54 of the authentication entity 5, are used for generating the local time information and performing the comparison with the time information 15c given in the One Time Credential OTC 15.

The authentication result 47 is transmitted to the restricted entity 4 as described hereinbefore. The cryptographic keys utilized in the generation and validation of the One Time Credential OTC may be symmetric or asymmetric, depending on the processing capacity of the mobile device 2 used and on the desired safety. If symmetric keys are used, the device key 12, in the mobile device 2, is equal to the device key 52 used in the authentication entity 5. The same occurs in relation to the authentication entity key 13, in the mobile device 2, and to the authentication entity key 53 provided in the authentication entity 5. In case asymmetric keys are used, the device key 12, in the mobile device 2, is private, whereas the device key 52, in the authentication entity 5, is public. In an analogous manner, the authentication entity key 53, in the authentication entity 5, is private, whereas the corresponding authentication entity key 13, in the mobile device 2, is public.

The One Time Credential OTC 15 that the user reads in the mobile device 2 and types in the intermediary device 3 should be easy to visualize and type. Its size depends on the font size of the characters used to represent the content thereof. In the case of an intermediary device 3 with a numeric keyboard, such as ATM or POS, it is usually employed a set of 10 characters selected from the digits 0 to 9. Eventually, this character set may comprise 12 characters, if the keyboard symbols "#" and "*" are added to the 10 digits. The character set may be far greater in alphanumeric keyboards, in which letters are added. When the One Time Credential OTP 15 is used in intermediary devices 3 having keyboards provided with several character sets, it is possible to select the adequate character set in the mobile device 2.

The invention claimed is:

1. An authentication method using ephemeral and anonymous credentials, in order to allow a user to effect his authentication, before an authentication entity, to gain access to a restricted entity, characterized in that it comprises the steps of:
   a—accessing, by the user, an intermediary device provided with a screen and enabled to run an access application which communicates with the restricted entity by a communication channel;
   b—requiring, on the screen of the intermediary device, a One Time Credential OTC necessary for authentication of the user;
   c—activating, by the user, a OTC program previously downloaded in a mobile device previously registered, by the user, in the authentication entity, in order to generate a One Time Credential OTC, based on information related to the user, to the restricted entity, to the mobile device and to the authentication entity;
   d—typing, by the user, the One Time Credential OTC, generated by the mobile device, in the intermediary device running the access application;
   e—transmitting, through the communication channel and by the access application, the One Time Credential OTC, from the intermediary device to the restricted entity, which runs a restricted application;
   f—transmitting the One Time Credential OTC from the restricted entity to the authentication entity, through a communication channel;
   g—decrypting, in the authentication entity, the One Time Credential OTC containing the information related to the user, to the restricted entity, to the mobile device and to the authentication entity;
   h—comparing, in the authentication entity the decrypted data of the One Time Credential OTC with the information related to the user, to the restricted entity, to the authentication entity and to the mobile device registered, by the user, in the authentication entity, and generating an authentication result;
   i—transmitting the authentication result to the restricted entity; and
   j—deciding, by the restricted entity, to accept or to reject the access of the user to the restricted entity, as a function of the authentication result,
   wherein the OTC program of the mobile device comprises a device key, an authentication entity key and a device clock, the OTC validation program of the authentication entity comprising a device key, an authentication entity key and an authentication entity clock, the One Time Credential OTC being generated from the information related to the user, to the restricted entity, and to the time information of the device clock, by using the device key and the authentication entity key, and the One Time Credential OTC, received in the authentication entity, being decrypted by the OTC validation program, using its authentication entity key, its device key and the time information of its authentication entity clock.

2. The method, according to claim 1, characterized in that the One Time Credential OTC is comprised of sequence of characters selected from at least one of the sets defined by digits, keyboard symbols, and letters of an alphabet.

3. The method, according to claim 1, characterized in that the mobile device is defined by a programmable mobile device capable of running the OTC program, being selected among any of the devices: cell phone, smart phone, smart watch, tablet, media player and a dedicated mobile device, in the form of a token.

4. The method, according to claim 1, characterized in that the intermediary device defines an interface between the user and the restricted entity, being selected among any of the devices: personal computer, notebook, tablet, media player, tokens, kiosks, vending machines, POSs (points of sale or terminals) and ATMs (automatic telling machines).

5. The method, according to claim 1, characterized in that the restricted application is any one protected by a login and password and capable of authorizing the access to sites, computers, networks, information storage, banks, withdrawals, cards.

6. The method, according to claim 1, characterized in that the restricted application is able to give access, by using codes deprived of passwords, to restricted systems selected from software licenses, tickets, vending machines, withdrawals, gift coupons.

* * * * *